No. 646,656. Patented Apr. 3, 1900.
H. H. FEFEL.
BICYCLE.
(Application filed May 11, 1898.)

(No Model.)

Witnesses: James Appenheim, A. E. Kornfeld

Inventor Henry H. Fefel by Frank L. Ober Atty.

THE NORRIS PETERS CO., PHOTO-LITHO., WASHINGTON, D. C.

UNITED STATES PATENT OFFICE.

HENRY H. FEFEL, OF NEW YORK, N. Y., ASSIGNOR TO THE MULTIPLE POWER COMPANY, OF WEST VIRGINIA.

BICYCLE.

SPECIFICATION forming part of Letters Patent No. 646,656, dated April 3, 1900.

Application filed May 11, 1898. Serial No. 680,333. (No model.)

*To all whom it may concern:*

Be it known that I, HENRY H. FEFEL, a citizen of the United States, residing at New York, in the county of New York and State of New York, have invented certain new and useful Improvements in Bicycles, of which the following is a full, clear, and exact description.

This invention relates to safety-bicycles, and embodies improvements in frame construction, as well as driving mechanism.

The object is to produce a bicycle of the chainless variety which shall be light, strong, and speedy and which shall provide means whereby power applied to a spur-wheel shall be transmitted directly to the hub of the rear wheel of the bicycle without the use of intermediate gears or other moving parts, the pedal movement being in a substantially-vertical line rather than rotary.

The invention consists of the details of construction hereinafter described and claimed, and illustrated in the accompanying drawings, in which—

Figure 1:
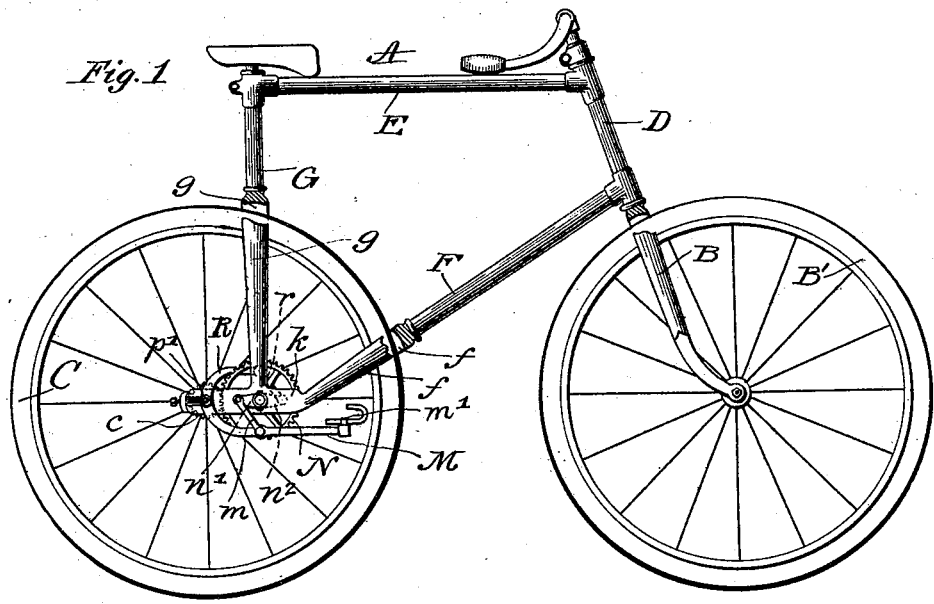
Figure 2:
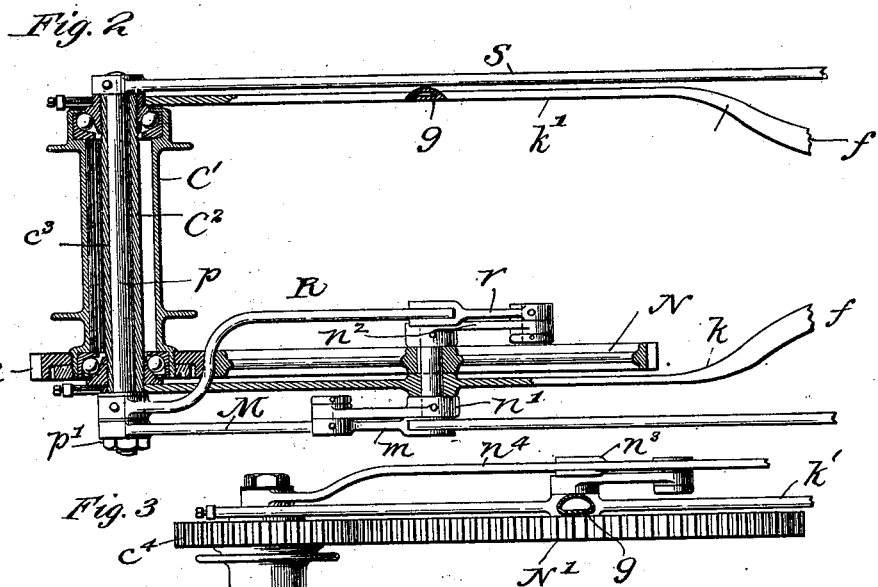

Figure 1 is a side elevation of my improved bicycle. Fig. 2 is a detail view in plan of a portion of Fig. 1, showing the gears and the hub of the rear wheel in section; and Fig. 3 is a modified form of my invention.

Referring to the drawings by letter, A represents the frame proper, and B the front fork, mounted thereon in the usual manner and supporting the front or steering wheel B'. The frame, disregarding the front fork, resembles in outline a right-angled triangle cut off near to the apex thereof and is built up of four principal parts—a steering-head D, an upper horizontal tube E, a lower oblique tube F, and a vertical tube G. The tubes E and F are forked or bifurcated and have their branches or tines $f f$ and $g g$ connected together in corresponding pairs by the brackets $k k'$. These brackets are similar in construction and extend, preferably in a horizontal plane, a short distance to the rear of tube F, the rear wheel C, carrying a pinion $c$ on the hub C' thereof, being mounted upon a hollow axle $C^2$, fixedly secured between such rearwardly-extending portions of said brackets $k$ $k'$. One of the aforesaid brackets affords a bearing for a spur-wheel N, the spur-wheel standing next to the inner face of the bracket adjacent wheel C and engaging with pinion $c$. The shaft of the spur-wheel N extends through the bracket and carries on its outer end a crank $n'$, a similar crank $n^2$, set oppositely thereto, being carried on inner end of said shaft. A link $m$ connects crank $n'$ with the rocking lever M, which, as herein shown, is pivoted concentrically with axle $C^2$ and is provided on the free end thereof with a suitable pedal $m'$. As above mentioned and as shown in Fig. 2, axle $C^2$ is provided with a central longitudinal bore $c^3$, through which a rod or shaft $p$ extends, the rod being somewhat longer than hub $c^2$. Lever M is loosely mounted upon one of the projecting ends of said rod $p$, between a nut $p'$ and an arm R. This arm is keyed or otherwise fixed to rod $p$ and is curved or bent over bracket $k$ and behind wheel N and is connected with crank $n^2$ by means of the link $r$. To the opposite end of rod $p$ a lever S, similar to lever M, is keyed or otherwise fixedly secured, the lever S, rod $p$, and arm R forming a practically-integral rocking frame. Both levers M and S are adapted to impart rotary motion to the spur-wheel N when properly actuated, as will be readily understood. The lever M, being loose on rod $p$, partakes of an independent movement of its own, and the cranks are so set that as one lever descends the other ascends, thus providing for graceful motion on the part of the rider, as well as a proper distribution of his energy.

Figure 3:
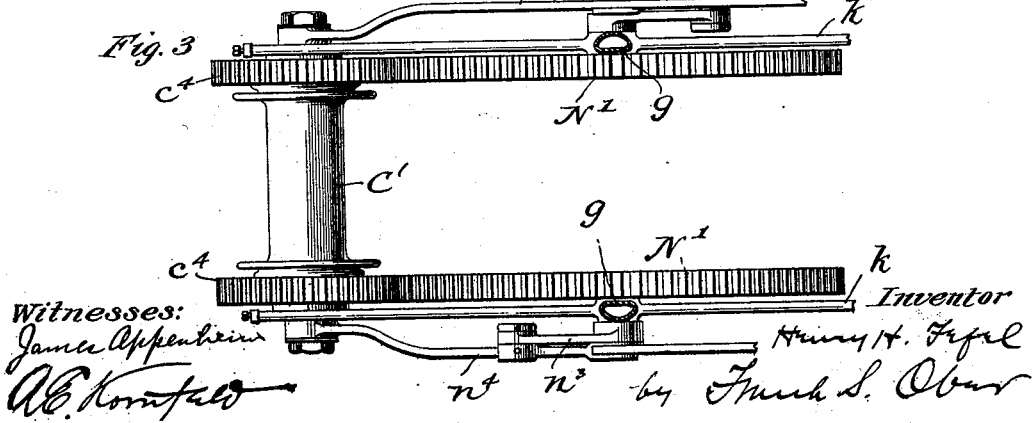

Fig. 3 shows a construction in which a complete driving-gear is shown on both sides of the machine, there being two pinions $c^4 c^4$ and two spur-wheels N' N', having single cranks $N^2 N^2$, and each operated by separate links and levers $n^3 n^3$ and $n^4 n^4$, respectively.

Having described my invention, I claim—

The combination of a suitable frame, a wheel mounted therein, a pinion on the hub of said wheel, a spur-wheel mounted on one side of the aforesaid frame engaging said pinion and having cranks mounted one on either end of the shaft thereof, a hollow axle, a rod extending through said axle, a pedal-lever tightly mounted to one end of said rod or shaft, a loosely-mounted pedal-lever and a tightly-mounted arm on the other end of said shaft, and a pair of links connecting the cranks aforesaid with the loosely-mounted pedal-lever and the tightly-mounted arm respectively, substantially as and for the purpose described.

In witness whereof I subscribe my signature in presence of two witnesses.

HENRY H. FEFEL.

Witnesses:
 FRANK S. OBER,
 JAMES OPPENHEIM.